United States Patent Office 3,253,940
Patented May 31, 1966

3,253,940
POLYAMIDES OF IMPROVED MELTING POINT AND INCREASED SOLUBILITY FOR INK BINDERS
Don E. Floyd, Robbinsdale, and David W. Glaser, St. Paul, Minn., assignors to General Mills, Inc., a corporation of Delaware
No Drawing. Filed Sept. 10, 1962, Ser. No. 222,652
10 Claims. (Cl. 106—316)

This invention relates to polyamide resins and solutions thereof suitable for use as flexographic ink vehicles and in particular to alcohol solutions of polyamides obtained by reacting a mixture comprising polymeric fat acids, alkylene polyamines, and a low aliphatic monobasic acid.

Flexographic inks are solvent based inks applied by rollers or pads to flexible sheets of plastic foil and paper. As new plastic films, such as polypropylene films, replace the widely used polyethylene films, higher temperatures are required for heat sealing the new plastic films. It is accordingly necessary that flexographic ink binders be found which will resist these higher temperatures and resist the attendant sticking together or blocking induced by the high temperatures. Of even greater importance than an ability to resist blocking at higher temperatures is solubility in alcohol solvents. The practical aspects of the use of these ink resins and the inks derived therefrom require that the polyamide resin be soluble in alcohol solvents, as such solubility must be attained without sacrificing toughness, adhesion, gloss, and chemical resistance.

Resistance to high temperatures may be achieved by the use, simply, of higher melting point resins. However, attempts to use such higher melting point resins have generally resulted in sacrificing alcohol solubility for high temperature characteristics. Conventional polyamide resins made from polymeric fat acids and ethylenediamine have proved relatively satisfactory for flexographic inks where solubility in denatured alcohol is not a prime requirement. However, in certain applications improved alcohol solubility would be a marked advantage.

We have now discovered that polyamides prepared from mixtures consisting essentially of alkylene polyamides, polymeric fat acids, and low aliphatic monobasic acids will provide advantageously high melting point resinous ink binders which exhibit the required non-blocking characteristics and have a greatly improved solubility in alcohol solvents. The solubility is markedly improved over conventional polyamides from polymeric fat acids and ethylenediamine without added low aliphatic acid.

It is therefore an object of this invention to provide a polyamide resin suitable for use as a flexographic ink binder.

It is also an object of this invention to provide a flexographic ink vehicle having a high melting polyamide binder which has a satisfactory alcohol solubility and the binder being substantially non-blocking under moderately elevated test temperature conditions.

The ideal solvent for a flexographic ink is denatured ethyl alcohol. Most of the compositions of the present invention exhibit excellent solubility in denatured alcohol. Certain of the higher melting point compositions are slightly less soluble in straight denatured alcohol, however for most purposes their solubility is adequate. In addition, small amounts of other solvents such as normal propanol, isopropanol, heptane, or aliphatic hydrocarbon mixtures yield ink binder solutions of satisfactory characteristics.

The polyamides of the present invention are prepared by reacting principally polymeric fat acids, an alkylene polyamine, and a low aliphatic monobasic acid. Reaction conditions for the preparation of the polyamide resins may be varied widely. Generally the reaction is carried out at a temperature within the range of about 150–250° C. Preferable the reaction is carried out at about 200° C. The time of reaction may also be varied widely and will depend somewhat on temperature. Normally a time period of 3 to 8 hours after reaching the selected temperature is required. The preferred time of reaction is about 5 hours. A typical set of reaction conditions is 205° C. for a period of 5 hours. Vacuum may be applied if desired to withdraw volatile by-products and to keep the resin mixture from contact with air which may cause darkening. An inert gas may also be employed to avoid contact with air.

The low aliphatic monobasic acids of the present invention are those of the general formula RCOOH, wherein R is hydrogen or an aliphatic radical of from 1 to 4 carbon atoms. Acids contemplated within the scope of this invention are formic acid, acetic acid, propionic acid, butyric acid, and the like. From a standpoint of physical properties, availability, and economics, acetic acid and propionic acid are the preferred acids of the present invention.

The alkylene polyamines which may be employed are those having the formula $H_2N(R'NH)_nH$ where $R'$ is an alkylene radical having from 2 to 3 carbon atoms, and $n$ is an integer from 1 to 4. Illustrative thereof are ethylenediamine, propylene diamine, diethylene triamine, triethylene tetramine, and the like. The amines of the reaction compositions of the present invention may be used singly or in mixtures, but the ethylene or propylene diamine content of any such mixture should account for at least half of the polyalkylene polyamine employed, and preferably the ethylene or propylene diamine content should represent three quarters of the amine groups present. Preferably, the polyamides of this invention are prepared with the equivalents of amine groups employed being substantially equivalent to the equivalents of carboxylic groups employed. However, slight excesses, of the order of up to about 10% of either acid groups or amine groups are contemplated within "substantially equivalent."

The polymeric fat acids which may be employed in preparing the polyamides are those resulting from the polymerization of drying or semi-drying oils or the free fat acids or the simple alcohol esters of these fat acids. The term "fat acids" is intended to include saturated, ethylenically unsaturated and acetylenically unsaturated naturally occurring any synthetic monobasic aliphatic acids containing from 8–24 carbon atoms. The term "polymeric fat acid" refers to polymerized fat acids. The term "polymeric fat radical" refers to the hydrocarbon radical of a polymerized fat acid, and is generic to the divalent, trivalent, and other polyvalent hydrocarbon radicals of dimerized fat acids, trimerized fat acids and higher polymers of fat acids. The divalent and trivalent hydrocarbon radicals are refrred to herein as "dimeric fat radical" and "trimeric fat radical" respectively.

The saturated, ethylenically unsaturated, and acetylenically unsaturated fat acids are generally polymerized by somewhat different techniques, but because of the functional similarity of the polymerization products, they all are generally referred to as "polymeric fat acids."

Saturated fat acids are difficult to polymerize but polymerization can be obtained at elevated temperatures with a peroxidic catalyst such as di-t-butyl peroxide. Because of the generally low yields of polymeric products, these materials are not currently commercially significant. Suitable saturated fat acids include branched and straight acids such as caprylic acid, pelargonic acid, capric acid, lauric acid, myristic acid, palmitic acid, isopalmitic aid, stearic acid, arachidic acid, behenic acid, and lignoceric acid.

The ethylenically unsaturated acids are much more readily polymerized. Catalytic or non-catalytic polymerization techniques can be employed. The non-catalytic polymerization generally requires a higher temperature. Suitable catalysts for the polymerization include acid or alkaline clays, di-t-butyl peroxide, boron trifluoride and other Lewis acids, anthroquinone, sulfur dioxide and the like. Suitable monomers include the branched straight chain, poly and mono ethylenically unsaturated acids such as 3-actenoic acid, 11-dodecenoic acid, linderic acid, lauroleic acid, myristoleic acid, tsuzuic acid, palmitoleic acid, petroselinic acid, oleic acid, elaidic acid, vaccenic acid, gadoleic acid, cetoleic acid, nervonic acid, linoleic acid, linolenic acid, eleostearic acid, hiragonic acid, moroctic acid, timnodonic acid, eicosatetraenoic acid, misinic acid, scoliodonic acid and chaulmoogric acid.

The acetylenically unsaturated fat acids can be polymerized by simply heating the acids. Polymerization of these highly reactive materials will occur in the absence of a catalyst. The acetylenically unsaturated acids occur only rarely in nature and are expensive to synthesize. Therefore, they are not currently of commercial significance. Any acetylenically unsaturated fat acid, both straight chain and branched chain, both mono-unsaturated and poly-unsaturated, are useful monomers for the preparation of the polymeric fat acids. Suitable examples of such materials include 10-undecynoic acid, tariric acid, stearolic acid, behenolic acid, and isamic acid.

Because of their ready availability and relative ease of polymerization, oleic and linoleic acid are the preferred starting materials for the preparation of the polymeric fat acids.

Typical compositions of commercially available polymeric fat acids based on unsaturated $C_{18}$ fat acids are:

$C_{18}$ monobasic acids 5–15% by weight;
$C_{36}$ dibasic acids 60–80% by weight;
$C_{54}$ (and higher) tribasic acids 10–35% by weight.

These mixtures may be fractionated by suitable means such as high vacuum distillation or solvent extraction techniques so as to obtain dimer acid cuts of higher concentration where necessary. For the purposes of the polyamides of the present invention, the monomeric fat acids content can vary over a fairly wide range, as low as 1–5% and as high as 15–20%.

The ratio of polymeric fat acids to low aliphatic monobasic acids employed in the present invention may vary over a considerable range. In general, compositions containing in the range of about 10 equivalent percent to about 35 equivalent percent of low aliphatic monobasic acids, have satisfactory melting points and solubilities. Compositions containing substantially less than 10 equivalent percent low aliphatic monobasic acids are found to exhibit relatively poor alcohol solubility. Compositions containing much more than 35 equivalent percent low aliphatic monobasic acids of the total of carboxylic acids tend to lose the desirable characteristics of toughness, adhesion, and chemical resistance.

Where highly specialized characteristics are desired, the compositions of the present invention can be modified by including in the reaction mixture other components: acids such as hydroxy aliphatic acids, for example lactic acid, and/or relatively low molecular weight dicarboxylic acids, for example azelaic acid. These acids will serve as modifiers, affecting the melting point, the alcohol solubility, and other characteristics.

In general, the polyamides of the present invention exhibiting satisfactory melting points and low blocking characteristics comprise those polyamides prepared from alkylene polyamines, polymeric fat acids, low monobasic aliphatic acids, and minor proportions of other aliphatic acids such as hydroxy acids and low aliphatic dicarboxylic acids. Total carboxylic functionality (derived from the polymeric fat acids, the low aliphatic monobasic acids, and any modifying carboxylic acid present) is maintained essentially equal to the amine functionality. That is, for every equivalent of amine groups, essentially one equivalent of carboxylic acids are employed. Polymeric fat acids and low monobasic fat acids comprise at least 90% of the carboxylic acid groups present, the ratio of polymeric fat acid carboxylic groups to low aliphatic monobasic acid carboxylic groups being in the range of 90:10 and 65:35, on an equivalents basis.

The solubility characteristics of the compositions of the present invention were determined by observing 35% solids solutions of the polyamides in a suitable solvent. Since at present, most flexographic presses have natural rubber rollers which are attacked or softened by a large variety of solvents including solvents such as aromatic and aliphatic hydrocarbons, ketones, and esters, the solvents employed in this invention are those which do not attack rubber. Such solvents are alcohols having the formula $R''OH$ where $R''$ is an aliphatic hydrocarbon radical having from 2 to 5 carbon atoms, such as ethanol, normal propanol, isopropanol, and butanol. Blends of these same alcohols with small amounts of other solvents such as aliphatic hydrocarbons and esters may be used where they can be tolerated, particularly if special synthetic rubber plates are to be used. Typical ink binders are employed as solutions of from about 25% to about 50% resin based on the total weight of solution. In addition, from about 0.1 to 6% water based on the total weight of solution may be present in the solvent in many cases.

Since the most important single feature of the polyamide compositions of the present invention is their alcohol solubility and since denatured alcohol is the preferred alcohol, the solubility characteristics of our compositions were determined by observation of 35% solids solutions in denatured ethanol (Filmex 1 Regular, U. I. Industrial Chemicals Co.: ethyl alcohol, 81.5%; isopropyl alcohol, 9.0%; methyl alcohol, 4.3%; water, 4.3%; methyl isobutyl ketone, 0.9%). Solutions were prepared, observed immediately, sealed and stored at room temperature (approximately 73° F.) for up to several weeks. During this storage, observations were made and the day noted at which gellation of the solution first was observed.

Blocking characteristics of flexographic inks are measured according to Tappi method D477. The resin binders of the present invention were applied from solution to label paper so that the dry film thickness was approximately 0.5 mil, the two coated surfaces placed in contact in a relative humidity of about 95%, under 1 lb./sq. in pressure, and at temperatures ranging from 130° F. to 160° F., and the average percent area sticking together as blocking was noted. Blocking was checked with coated side to coated side or face-to-face and coated side to uncoated side or face-to-back. Melting points (softening points) of the polyamide resins of the present invention were measured by conventional "Ball and Ring" melting point determinations, ASTM E2858T.

The invention can further be illustrated by the following examples in which the polymeric fat acids are polymerized tall oil fatty acids and in which all parts and percentages are by weight unless specically noted otherwise. The following examples are intended to be illustrative and not limiting on the scope of the invention.

Example I

A polyamide resin was prepared as follows: A reaction mixture consisting of 0.777 gram equivalents (717 grams) of polymerized tall oil fatty acids, 0.223 gram equivalents (13.4 grams) of acetic acid, 0.90 gram equivalents (27.0 grams) of ethylene diamine, and 0.10 gram equivalents (3.4 grams) of diethylene triamine was charged to a round-bottom, 3-neck flask fitted with thermometer, mechanical stirrer and distilling column and head. The mixture was stirred and heated to 100° C., held at that temperature for fifteen minutes, and then heated to 140° C. at which point the by-product water began to distill out. The temperature was gradually raised to 200° C. while the by-product water continued to distill out and held at 200° C. for four hours, the last hour under reduced pressure of about 15–20 mm. The vacuum was released and the product removed from the flask and cooled. An amber-colored, hard, solid resin was obtained.

*Example II*

A series of polyamides was made according to the procedure of Example I, varying the composition as indicated in the following table.

The control sample above was also tested in a solvent consisting of 90% denatured ethanol and 10% n-propanol and was found to be insoluble therein. Product II–1 was also tested for solubility in the 90:10 solvent mixture above and was completely soluble therein at 35% solids. In addition, product II–12 exhibited very good solubility when tested at 35% solids in a solvent consisting of 1 part n-propanol and 2 parts denatured ethanol.

*Example III*

A varnish for a flexographic ink was prepared by dissolving the polyamide, Example II–2, at 35% N.V. in denatured ethanol. This varnish was studied for properties important in flexographic ink formulations—

| Prep. | Equivalents Polymerized Fat Acids | Monocarboxylic Acids | | Equivalents Azelaic Acid | Equivalents Ethylene Diamine | Equivalents Diethylene Triamine |
|---|---|---|---|---|---|---|
| | | Type | Equiv. | | | |
| Control | 1.0 | | | | 1.0 | |
| II–1 | .833 | Acetic | .167 | | .90 | .10 |
| II–2 | .777 | do | .223 | | .90 | .10 |
| II–3 | .777 | do | .223 | | 1.00 | |
| II–4 | .777 | do | .223 | | .80 | .20 |
| II–5 | .777 | do | .223 | | .85 | .15 |
| II–6 | .75 | do | .22 | .03 | .90 | .10 |
| II–7 | .75 | do | .25 | | .90 | .10 |
| II–8 | .75 | Propionic | .25 | | 1.00 | |
| II–9 | .75 | Formic | .22 | .03 | .90 | .10 |
| II–10 | .777 | Butyric | .223 | | .90 | .10 |
| II–11 | .70 | Acetic | .223 | .077 | .90 | .10 |
| II–12 | .777 | Propionic | .223 | | .90 | .10 |

The preparations outlined above had the following properties:

| Prep. | Softening Point, ° C. | Amine Number | Acid Number | Solubility, at 35% solids, 73° F., in denatured ethanol | |
|---|---|---|---|---|---|
| | | | | Initial | Days to gellation |
| Control | 110 | 4.1 | 3.9 | Insoluble[1] | |
| II–1 | 120 | 4.4 | 3.7 | Complete[2] | 1 |
| II–2 | 127.5 | 8.6 | 5.0 | do | >39 |
| II–3 | 131.2 | 2.8 | 3.2 | do | 14 |
| II–4 | 120.8 | 9.1 | 6.0 | do | >38 |
| II–5 | 121.5 | 7.4 | 6.0 | do | >33 |
| II–6 | 126.5 | 6.4 | 4.3 | do | >24 |
| II–7 | 128.8 | 6.3 | 4.9 | do | >24 |
| II–8 | 144.2 | 3.9 | 3.4 | do | 1 |
| II–9 | 99.8 | 8.4 | 2.1 | Hazy | 1 |
| II–10 | 134.1 | 6.6 | 3.3 | Complete | 1 |
| II–11 | 131.4 | 6.4 | 5.7 | do | >24 |
| II–12 | 136.8 | 6.0 | 3.7 | do | 2 |

[1] Soluble hot, but on cooling gels and separates into two indistinct phases.
[2] Clear solution at room temperature.

Sward hardness _____ 21
Tack-free time, 1.5 mil wet film _____minutes__ 3
Gloss on label paper, 1.5 mil wet film _____ 74
Percent blocking at 130° F., 1 p.s.i., 95% relative humidity, 24 hours:
  Face to face _____ None
  Face to back _____ None
Percent extensibility, G.E. Impact-Flexibility Tester _____percent__ 5–10
Compatibility test, 70/30 ratio, by weight with S.S., ¼ second, nitrocellulose _____ Compatible

*Example IV*

The effect of addition of relatively small proportions of lactic acid can be seen in the following preparations:

| Prep. | Polymeric Fat Acids Equiv. | Other Carboxylic Acids | | Equiv. Ethylene Diamine | Equiv. Diethylene Triamine | Softening Point | Solubility, at 35% solids, 73° F. in denatured ethanol | |
|---|---|---|---|---|---|---|---|---|
| | | Type | Equiv. | | | | Initial | Days to gellation |
| II–2 | 0.777 | Acetic | 0.223 | .90 | .10 | 127.5 | Complete | >39 |
| IV–1 | 0.77 | Acetic / Lactic | 0.18 / 0.05 | .90 | .10 | 119.6 | do | >42 |
| II–12 | 0.777 | Propionic | 0.223 | .90 | .10 | 136.8 | do | 2 |
| IV–2 | 0.77 | Propionic / Lactic | 0.18 / 0.05 | .90 | .10 | 130.2 | do | 20 |

Example V

To 100 parts by weight of the varnish of Example IV was added 40 parts by weight of rutile titanium dioxide pigment. The pigmented mixture was ground in a pebble mill to give a highly fluid, white ink suitable as a flexographic ink. The gloss of this ink on label paper was 60, as measured with a 60° gloss meter. The ink was very stable, showing no changes for at least one month. It demonstrated excellent adhesion to treated polyethylene fiber.

The embodiments of the present invention in which an exclusive property or privilege is claimed are defined as follows:

1. A polycarbonamide composition having a high melting point and increased alcohol solubility comprising the condensation product of (A) polyalkylene polyamines of the general structure $$H_2N(R'NH)_nH$$

where R' is an alkylene radical having from 2 to 3 carbon atoms and $n$ is an integer from from 1 to 4, with at least one-half of the mixture of said polyalkylene polyamines being those in which $n=1$, (B) low aliphatic monocarboxylic acids of the general structure $$RCOOH$$

where R is selected from the group consisting of hydrogen and saturated aliphatic hydrocarbon radicals of from 1 to 4 carbon atoms, and (C) polymeric hydrocarbon fat acids; the equivalents of amine groups employed being substantially equivalent to the equivalents of carboxylic groups employed, where as least 90 equivalent percent of the carboxylic acid groups employed are derived from the polymeric fat acids and the low aliphatic monocarboxylic acids, with the equivalent ratio of polymeric fat acids to low aliphatic monocarboxylic acids being in the range of 90:10 to 65:35.

2. The polycarbonamide composition of claim 1 where the low aliphatic monocarboxylic acid is acetic acid.

3. The polycarbonamide composition of claim 1 where the low aliphatic monocarboxylic acid is propionic acid.

4. The polycarbonamide composition of claim 2 wherein the polyalkylene amines employed consist essentially of a mixture of ethylene diamine and diethylene triamine in an equivalent ratio of 90:10 ethylene diamine to diethylene triamine.

5. The polycarbonamide composition of claim 3 wherein the polyalkylene amines employed consist essentially of a mixture of ethylene diamine and diethylene triamine in an equivalent ratio of 90:10 ethylene diamine to diethylene triamine.

6. A solution of the polycarbonamide condensation product, having a high melting point and increased alcohol solubility, of (A) polyalkylene polyamines of the general structure $$H_2N(R'NH)_nH$$

where R' is an alkylene radical having from 2 to 3 carbon atoms and $n$ is an integer from 1 to 4, and where at least one-half of the mixture of said polyalkylene polyamines being those in which $n=1$, (B) low aliphatic monocarboxylic acids of the general structure $$RCOOH$$

where R is selected from the group consisting of hydrogen and saturated aliphatic hydrocarbon radicals of from 1 to 4 carbon atoms, and (C) polymeric hydrocarbon fat acids; the equivalents of amine groups employed being substantially equivalent to the equivalents of carboxylic groups employed, where as least 90 equivalent percent of the carboxylic acid groups employed are derived from the polymeric fat acids and the low aliphatic monocarboxylic acids, with the equivalent ratio of polymeric fat acids to low aliphatic monocarboxylic acids being in the range of 90:10 to 65:35, in an alcoholic solvent.

7. The solution of claim 6 wherein the alcoholic solvent is selected from the group consisting of lower aliphatic alcohols and mixtures thereof.

8. The solution of claim 6 wherein the alcoholic solvent is denatured ethanol.

9. The solution of claim 6 wherein the alcoholic solvent is a mixture of denatured ethanol and an aliphatic hydrocarbon, wherein the denatured ethanol content is from 50 to 97% by weight.

10. A flexographic ink binder consisting essentially of a solution of the polycarbonamide condensation product, having a high melting point and increased alcohol solubility, of (A) polyalkylene polyamines of the general structure $$H_2N(R'NH)_nH$$

where R' is an alkylene radical having from 2 to 6 carbon atoms and $n$ is an integer from 1 to 4, and where at least one-half of the mixture of said polyalkylene polyamines being those in which $n=1$, (B) low aliphatic monocarboxylic acids of the general structure $$RCOOH$$

where R is selected from the group consisting of hydrogen and saturated aliphatic hydrocarbon radicals of from 1 to 4 carbon atoms, and (C) polymeric hydrocarbon fat acids; the equivalents of amine groups employed being substantially equivalent to the equivalents of carboxylic groups employed, where at least 90 equivalent percent of the carboxylic acid groups employed are derived from the polymeric fat acids and the low aliphatic monocarboxylic acids, with the equivalent ratio of polymeric fat acids to low aliphatic monocarboxylic acids being in the range of 90:10 to 65:35, in an alcoholic solvent.

References Cited by the Examiner

UNITED STATES PATENTS 2,450,940  10/1948  Cowan et al. _____ 260—18

FOREIGN PATENTS 825,089  12/1959  Great Britain.
845,560  8/1960  Great Britain.

WILLIAM H. SHORT, *Primary Examiner.*

HAROLD D. ANDERSON, *Assistant Examiner.*